March 29, 1955
R. N. BROOKINS
2,705,151
VEHICLE HAVING LATERALLY ADJUSTABLE WHEELS
Original Filed Sept. 20, 1948
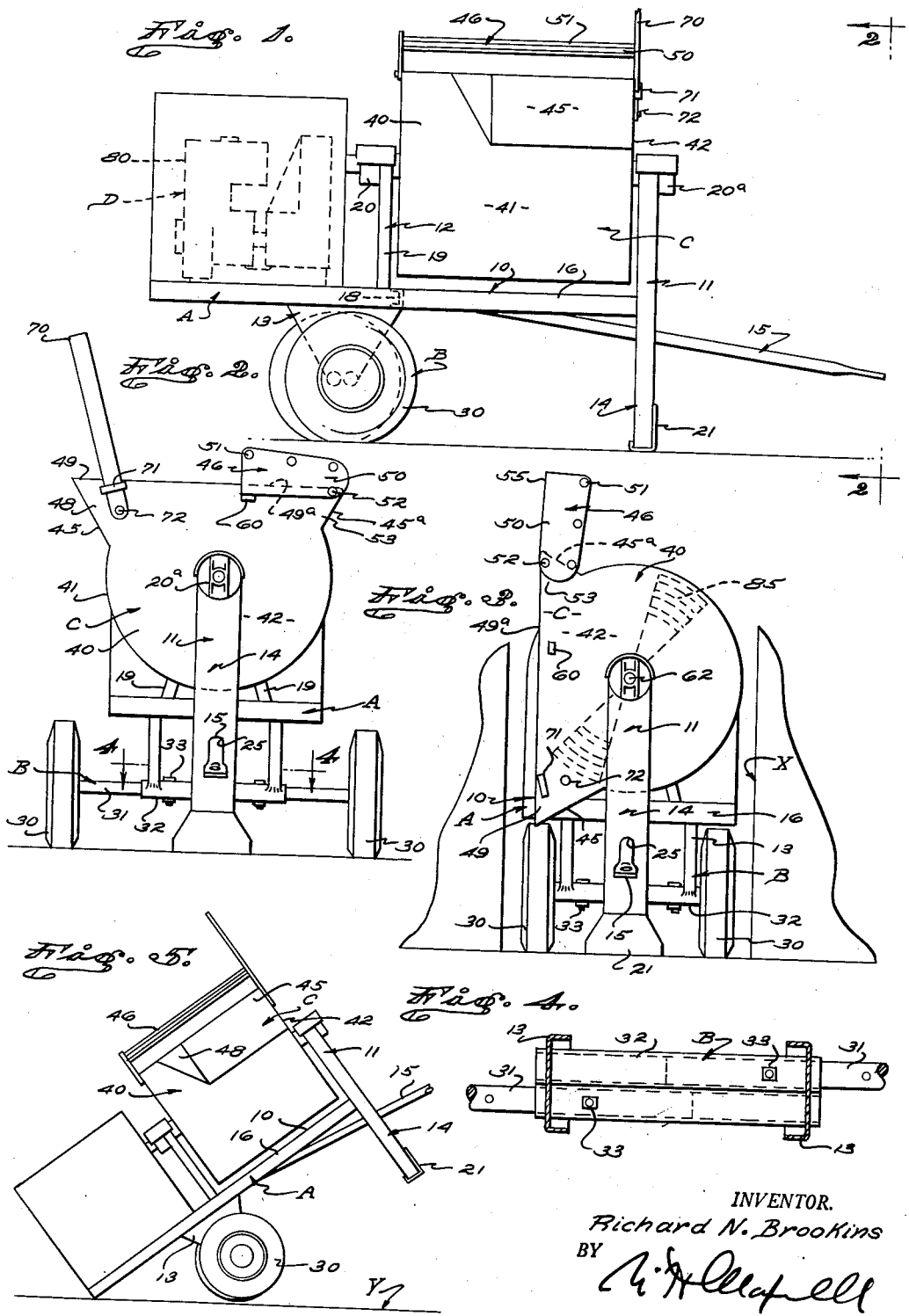
INVENTOR.
Richard N. Brookins
BY
Attorney

United States Patent Office 2,705,151
Patented Mar. 29, 1955

2,705,151

VEHICLE HAVING LATERALLY ADJUSTABLE WHEELS

Richard N. Brookins, South Gate, Calif., assignor to Essick Manufacturing Company, Los Angeles, Calif., a corporation of California Original application September 20, 1948, Serial No. 50,071, now Patent No. 2,499,052, dated February 28, 1950. Divided and this application December 19, 1949, Serial No. 133,794

1 Claim. (Cl. 280—34)

This invention has to do with a wheeled vehicle and it is a general object of the invention to provide a simple practical improved vehicle construction by which the supporting wheels of the vehicle are adjustable between contracted and extending positions to meet various conditions of operation or use.

This application is filed as a division of my co-pending application entitled "Portable Mixer" filed September 20, 1948, Serial No. 50,071, on which Patent No. 2,499,052 issued February 28, 1950.

There are various situations in which wheeled vehicles require that the supporting wheels be adjustable to vary their spacing, and a typical example of such a situation is the structure which is set forth and claimed in the above-identified parent application. The present invention is concerned with and directed to the construction by which I gain adjustment or variation of the supporting wheels of a vehicle and it is not concerned with nor is it in any way limited to use in combination or connection with features of body construction, mixer construction, or the like, such as are the subject of the said parent application.

The present invention provides essentially a vehicle frame characterized by an elongate base normally horizontal and legs which depend from the base and are spaced apart transversely of the vehicle. In a simple case two wheels are provided and each wheel has an axle projecting inwardly therefrom. Guides are provided on or carried by the legs and receive and guide the axles. The guides are preferably tubular and are arranged side by side in a horizontal plane. It is preferred that the guides be of equal length and that they be arranged so that their ends occur at corresponding points. The guides are narrower than the frame and the guides and axles are so related that the axles can operate in the guides so the wheels may be within the sides of the frame or outward of or beyond the sides of the frame. A suitable releasable fastening means is provided for securing the axles against movement relative to the guides so the wheels can be set in the desired adjusted positions. The construction is such that the frame has a forwardly projecting portion that can be lifted or elevated to cause the rear end portion of the frame to engage the ground and form a fulcrum about which the frame may swing so the wheels are lifted from the ground thus relieving pressures so the wheels can be readily adjusted either in or out, as circumstances require.

It is a general object of this invention to provide a vehicle construction of the general character referred to which involves but few simple, inexpensive parts and which is wholly free of complicated mechanisms such as generally characterize devices of this general type.

A further object of the invention is to provide a vehicle construction of the general character referred to which provides guides slidably supporting the wheel carrying axles so that the axles are at all times effectively held or maintained in the guides thus providing adequate support for the axles.

It is a further object of the invention to provide a vehicle construction of the general character referred to in which the parts are related in such manner as to enable the user or operator to relieve pressure from the axle construction so that the desired adjustments can be made easily and quickly and without resort to jacks or other such mechanisms.

The various objects and features of my invention will be fully understood from the following detailed description of a typical preferred form and application of the invention, throughout which description reference is made to the accompanying drawings, in which:

Fig. 1 is a side elevation of a vehicle including structure provided by the present invention showing the vehicle from one side. Fig. 2 is a front end elevation of the structure, being a view showing the structure with the supporting wheels spread so that the structure is stable and effectively supported. Fig. 3 is a view similar to Fig. 2 showing the supporting wheels contracted and vehicle body in position to be passed through a narrow opening such as a doorway. Fig. 4 is an enlarged plan section taken as indicated by line 4—4 on Fig. 2, and Fig. 5 is a reduced side elevation showing the structure tilted in a manner to lift the supporting wheels from the ground so that they can be readily adjusted either in or out.

The structure or vehicle provided by the present invention involves, generally, a frame A and an adjustable wheel support B for the frame. In the drawings and for purpose of illustration the vehicle is shown provided with a body in the form of a mixer C carried by the frame. Power means D is supported by the frame and drives the mixer.

The frame A may, in practice, vary widely in form and construction and it is provided, primarily, as a structure or element to which the other principal elements of the vehicle are joined. In the particular form of the invention illustrated the frame A involves, generally, a base or platform 10, front and rear standards 11 and 12 projecting upwardly from the base, a stabilizing base or rest 14 depending from the base, and a draft tongue 15.

The particular base 10 illustrated in the drawings is formed or made up of side rails or beams 16 that extend longitudinally of the structure and in practice the beams may be angularly related, for instance, they may have their forward ends joined to the front standard 11 or to the point where the standard 11 joins the rest 14, in which case the beams preferably extend rearwardly and diverge to be wide apart at the rear of the structure where they support the power means D. It will be apparent that one or more lateral frame members or spreaders 18 may be provided in the base construction to stabilize the beams as circumstances may require. In the preferred arrangement the beams 16 are inwardly faced channel-shaped members and they are such as to be horizontally disposed in order to from a horizontal base or platform 10 when the structure is in the positions shown in Figs. 1 to 3 of the drawings.

The front standard 11, which may be considered as a part or element of the mixer construction, is located at the forward end of the base and it is preferably integrally joined to the beams of the base to project upwardly therefrom in the manner clearly shown throughout the drawings.

The rear standard 12, which like standard 11 is for the mixer, is located rearward of the front standard 11 and has spaced legs 19 joined to the beams 16 and extending upwardly to a bearing 20 which carries the mixer.

The stabilizing base or rest 14 depends from the forward end of the base 10 and it may, as shown in the drawings, be an integral extension or continuation of the front standard 11. In the preferred construction the lower end of the rest is provided with an enlargement or foot 21 suitable for resting on the ground, or the like.

The draft tongue 15 extends longitudinally of the structure and is preferably located centrally thereof. In the preferred arrangement the tongue is suitably anchored to the parts just described. For instance, its rear end may be secured to a transverse frame member 18, or the like, while its forward end portion extends through a suitable opening 25 in the rest 14 and projects a substantial distance forward of the rest, as clearly shown in Fig. 1 of the drawings. In practice, it is desirable that the draft tongue extend forward and somewhat downward as shown in the drawings, so that when it is elevated to a substantially horizontal position the rest 14 is lifted clear of the ground while the base 10, although tilted somewhat from the horizontal position, is clear of the ground.

The adjustable wheeled support B may involve one or more pairs of wheels and when one pair of wheels is employed as shown in the drawings it is located somewhat to the rear of the center of gravity of the other parts of the structure as a whole and cooperates with the support 14 to hold the structure in an upright or working position when at rest, as is shown in Fig. 1 of the drawings.

A typical unit or form of support A involves, generally, a pair of supporting wheels 30, axles 31 carrying the wheels, guides 32 carried by the frame and slidably supporting the axles, and means or holders 33 releasably holding the axles against movement in the guides. In the case illustrated the guides are carried by the legs 13 that depend from the base.

The wheels 30 are preferably alike and are suitably mounted on the outer ends of the axles 31, the inner ends of the axles being slidably carried in the guides 32, one axle being carried in one guide and the other axle being carried in the other guide.

The guides 32 are preferably simple tubular parts fixed to the lower ends of the legs 13 and disposed transversely of the frame. The guides are preferably of equal lengths and are located side by side in a common horizontal plane and they terminate at points well within the sides of the frame so that the axles can be slid in the guides to positions where the wheels are within the confines of the frame, as shown in Fig. 3 of the drawings. It is to be observed that the axles and guides are so related and proportioned as to allow the axles to be extended or operated in the guides so that the wheels 30 are supported in positions where they are outward of or laterally removed from the frame substantial distances, with the result that the wheels are wide or far apart, providing stable support for the structure as shown in Fig. 2 of the drawings. When the axles are in so the wheels are contracted or close together the axles are overlapped a substantial amount and in the particular case illustrated the axles are overlapped somewhat even when the wheels are spread or extended.

It is preferred in practice to arrange the guides side by side and with their ends aligned and it is preferred to relate the axles and guides so that when the wheels are spread or extended the axles have extended bearing or supporting engagement in the guides as shown in Fig. 4 of the drawings.

The holders 33, serving to releasably hold the axles against sliding movement in the guides, may be simple bolts or bolt-like fasteners engaged through openings in the guides and axles, which openings register when the wheels are in the desired positions, for example, either retracted, as shown in Fig. 3, or extended, as shown in Fig. 2.

The mixer body or structure shown carried by the frame is, for example, shown as involving a drum or body 40 formed of a curved shell 41 with a side opening and ends 42 closing both ends of the shell. The mixer has a laterally projecting discharge lip 45 adjoining and projecting outward from one edge of the shell opening and a sack support or rack 46 pivotally connected to the shell to be located adjacent or in the vicinity of the opposite edge of the shell opening. In the preferred construction a lip 45ª projects from the edge of the shell opening opposite that from which the lip 45 projects and flanges 53 on the ends 42 of the shell engage and support the ends of lip 45ª. The rack 41 is pivotally supported adjacent lip 45ª.

The discharge lip 45 is fixed to the shell and flanges 48 project from the shell and join to the ends of the lip 45 which flanges 48 have edges 49 disposed tangential to the shell or to a circle somewhat smaller than and concentric with the shell and the edges 49 are in line with like edges 49ª on the flanges 53.

The sack holder or rack 46 is shown as involving spaced side plates 50 having supporting bars 51 extending between the plates and a pivot bar 52 pivotally connects the rack to flanges 53 adjacent the outer edge of lip 45ª. When the rack is in operating position, as shown in Fig. 3, the plates 46 project outward from the shell and the bars 51 are located to effectively support the sack or sacks in the course of their being emptied into the shell between the lips that project at the shell opening. The mounting of the rack through the pivot bar 52 allows the rack to be moved to an inoperative position as shown in Fig. 3, where edges 55 of the plates are substantially flush with one side of the structure and are substantially parallel with the edges 49 and 49ª of flanges 48 and 53 respectively, when the shell is tilted to a position where its opening faces one side of the structure, all as clearly shown in Fig. 3 of the drawings. In the preferred arrangement of parts stops 60 are provided to support the rack in the operating position shown in Fig. 2, the stops being projections on the ends 42 of the mixer body which projections are located to be engaged by the plates 46 of the rack. One of the bars 51 is so located as to stop the rack in the other position, as shown in Fig. 3, the side bar 51 being located to engage or stop against the flanges 53.

The mixer has trunnions 62 projecting from the ends of the body 40 and carried in bearings 20 and 20ª provided on the standards 11 and 12, respectively.

An operating handle 70 is provided for tilting or rocking the body 40 between positions such as are shown in Figs. 2 and 3, and in accordance with the preferred form of the invention the handle 70 is releasably coupled to the body 40 by means of a stirrup-like guide 71 and a pin 72 projecting from the body to enter a hole in the handle, as clearly shown in Fig. 2 of the drawings. The construction is such that the handle 70 normally projects from the body 40 forming an effective operator, whereas by tilting the handle it may be disengaged from the pin 72 following which it can be slid from the stirrup 71.

The power means D is mounted on the rear end portion of the frame A or on the base 10 rearward of the mixer C. Any suitable prime mover, as for instance, a motor or engine 80, may be employed as the driving unit of the means D and any suitable drive may be provided between such engine or motor and a suitable agitator 85 provided in the body 40.

When the structure illustrated is in use the body 40 may be positioned so that the opening in the shell faces upwardly as shown in Fig. 2 and the sack rack 46 may be positioned to project upwardly from the shell of the body at the side of the opening removed from the discharge lip 45. Further, with the structure provided by this invention, the wheels 30 may be set in the spread or extended position where they effectively support and stabilize the structure. After a charge of material has been mixed the body may be tilted through operation of the handle 70 so that the material discharges over the lip 45.

When it is desired to transport the structure from one location to the other as by means of a draft vehicle, it is merely necessary to lift the forward end of the structure and attach the draft tongue 15 to the draft vehicle. The wheels in the spread position are far enough apart so that the structure is stable and can be operated over ordinary pavements at speeds commonly attained by motor vehicles.

When it is desired to pass the structure through a limited opening, as for instance, through a doorway X, as shown in Fig. 3, or to operate it over a narrow roadway or support, the wheels are moved to a contracted or possibly a fully collapsed position. When the body shown is provided on the frame it is operated to the tilted position where the shell opening is at one side of the structure, and the sack rack is pivoted to an upwardly projecting position, all as shown in Fig. 3 of the drawings.

To facilitate adjustment of the wheels either in or out, it is merely necessary to lift the forward end of the structure by means of the draft tongue, causing the rear end portion of the frame to engage and pivot on the ground Y on which the structure is located. Through this action, as shown in Fig. 5, the wheels may be lifted from the ground making it simple and easy to effect the desired adjustment.

Having described only a typical preferred form and application of my invention, I do not wish to be limited or restricted to the specific details herein set forth, but wish to reserve to myself any variations or modifications that may appear to those skilled in the art and fall within the scope of the following claim.

Having described my invention, I claim:

A vehicle including, an elongate frame having an elongate base and legs rigid with and depending from the base and spaced apart transversely of the base, tubular guides carried by the legs and arranged side by side in a horizontal plane and extending transversely of the vehicle, an axle slidably carried by each guide, a wheel carried by each axle, pins engaged through the guides and axles releasably holding the axles against movement relative to the guides, the frame being normally substantially horizontal and having portions projecting forwardly and rearwardly of the wheels and the forward portion being movably upward to rock the rear end portion of the frame into a position forming a fulcrum about which the wheels are moved for elevation.

References Cited in the file of this patent

UNITED STATES PATENTS

| | | |
|---|---|---|
| 107,710 | Osgood | Sept. 27, 1870 |
| 940,169 | Lathrop | Nov. 16, 1909 |
| 1,265,098 | McKnight | May 7, 1918 |
| 1,824,234 | Rhodes et al. | Sept. 22, 1931 |
| 2,365,167 | Billings | Dec. 19, 1944 |
| 2,405,674 | Schilwa et al. | Aug. 13, 1946 |